(12) United States Patent
Sakisaka et al.

(10) Patent No.: US 10,753,205 B2
(45) Date of Patent: Aug. 25, 2020

(54) TURBINE SHAFT AND TURBOCHARGER

(71) Applicant: IHI Corporation, Koto-ku (JP)

(72) Inventors: Ryota Sakisaka, Tokyo (JP); Takahiro Kobayashi, Tokyo (JP); Shinichi Kaneda, Tokyo (JP); Kenji Bunno, Tokyo (JP)

(73) Assignee: IHI Corporation, Koto-ku (JP)

( * ) Notice: Subject to any disclaimer, the term of this patent is extended or adjusted under 35 U.S.C. 154(b) by 35 days.

(21) Appl. No.: 16/104,194

(22) Filed: Aug. 17, 2018

(65) Prior Publication Data

US 2018/0355723 A1   Dec. 13, 2018

Related U.S. Application Data

(63) Continuation of application No. PCT/JP2017/014620, filed on Apr. 10, 2017.

(30) Foreign Application Priority Data

Apr. 14, 2016   (JP) .................................. 2016-080897

(51) Int. Cl.
*F01D 5/02* (2006.01)

(52) U.S. Cl.
CPC .......... *F01D 5/025* (2013.01); *F05D 2220/40* (2013.01); *F05D 2230/232* (2013.01); *F05D 2240/24* (2013.01); *F05D 2240/60* (2013.01)

(58) Field of Classification Search
CPC .......... F01D 5/025; F01D 5/046; F01D 11/02; F04D 29/20; F02C 6/12; F05D 2220/40;
(Continued)

(56) References Cited

U.S. PATENT DOCUMENTS 4,942,999 A * 7/1990 Oda ...................... C04B 37/026
228/118
9,803,482 B2 * 10/2017 Striedelmeyer ......... F01D 5/025
(Continued)

FOREIGN PATENT DOCUMENTS

CN    1693675 A    11/2005
CN  203476403 U    3/2014
(Continued)

OTHER PUBLICATIONS

International Search Report dated Jul. 4, 2017 in PCT/JP2017/014620, filed on Apr. 10, 2017 (with English Translation).
(Continued)

*Primary Examiner* — Richard A Edgar
(74) *Attorney, Agent, or Firm* — Oblon, McClelland, Maier & Neustadt, L.L.P.

(57) ABSTRACT

A turbine shaft includes: a turbine impeller having a protruding portion provided on a back surface of a main body portion thereof and a welded surface provided on the back surface of the main body portion in a radially outer side of the protruding portion; and a shaft having an end hole provided on the one end surface thereof, the end hole in which the protruding portion is inserted, a welding surface provided in a radially outer side of the end hole and welded to the welded surface, a second seal groove provided in another end side with respect to the welding surface, and an enlarged diameter portion formed between the welding surface and the second seal groove, a diameter of the enlarged diameter portion expanding radially outward from the welding surface side toward the second seal groove side.

12 Claims, 3 Drawing Sheets

(58) Field of Classification Search
CPC ........... F05D 2230/232; F05D 2240/24; F05D 2240/60
USPC .......................................... 416/213 R, 244 A
See application file for complete search history.

(56) References Cited

U.S. PATENT DOCUMENTS

| | | | |
|---|---|---|---|
| 10,047,607 B2* | 8/2018 | Thirion | ................... F01D 5/063 |
| 2006/0021221 A1 | 2/2006 | Decker | |
| 2014/0321905 A1 | 10/2014 | Arai | |
| 2015/0159487 A1 | 6/2015 | Thirion et al. | |
| 2015/0198043 A1 | 7/2015 | Striedelmeyer et al. | |

FOREIGN PATENT DOCUMENTS

| | | |
|---|---|---|
| CN | 104696017 A | 6/2015 |
| CN | 104791016 A | 7/2015 |
| DE | 10 2014 213 132 A1 | 7/2015 |
| EP | 1 621 774 A2 | 2/2006 |
| JP | 2001-254627 A | 9/2001 |
| JP | 2004-52616 | 2/2004 |
| JP | 2006-37952 | 2/2006 |
| JP | 2007-205253 | 8/2007 |
| JP | 2007-229792 | 9/2007 |
| JP | 2009-144633 | 7/2009 |
| JP | 4304190 | 7/2009 |
| JP | 2010-96115 | 4/2010 |
| JP | 2010-101269 | 5/2010 |
| JP | 2011-196256 | 10/2011 |
| JP | 2012-137099 | 7/2012 |
| JP | 2012-177355 | 9/2012 |
| JP | 5029341 | 9/2012 |
| JP | 5071345 | 11/2012 |
| JP | WO2013/080828 | 6/2013 |
| JP | 2013-194528 | 9/2013 |
| JP | 2014-126018 | 7/2014 |
| JP | 2014-177933 | 9/2014 |
| WO | WO 2015/002141 A1 | 1/2015 |
| WO | WO 2015/107981 A1 | 7/2015 |

OTHER PUBLICATIONS

Written Opinion dated Jul. 4, 2017 in PCT/JP2017/014620, filed on Apr. 10, 2017.
International Preliminary Report on Patentability and Written Opinion dated Oct. 25, 2018 in PCT/JP2017/014620 (English Translation only), 9 pages.

* cited by examiner

TURBINE SHAFT AND TURBOCHARGER

CROSS REFERENCE TO RELATED APPLICATIONS

This application is a continuation application of International Application No. PCT/JP2017/014620, filed on Apr. 10, 2017, which claims priority to Japanese Patent Application No. 2016-080897, filed on Apr. 14, 2016, the entire contents of which are incorporated by reference herein.

BACKGROUND ART

Technical Field

The present disclosure relates to a turbine shaft including a shaft and an impeller and a turbocharger.

Related Art

In the related art, turbochargers in which a shaft is pivotally supported by a bearing housing in a freely rotatable manner are known. One end of the shaft is provided with a turbine impeller. The other end of the shaft is provided with a compressor impeller. Such a turbocharger is connected to an engine. The turbine impeller rotates by exhaust gas discharged from the engine. The rotation of the turbine impeller causes the compressor impeller to rotate via the shaft. In this manner, the turbocharger compresses the air along with the rotation of the compressor impeller and delivers the air to the engine.

In Patent Literature 1, a welding structure between an impeller and a shaft is described. Specifically, an insertion portion formed at a front end of a shaft is inserted into a recessed portion provided on a back surface of the impeller. On a base end side of the insertion portion of the shaft, a welding surface is formed at a portion protruding radially outward from the recessed portion. The welding surface of the shaft abuts against the back surface of the impeller in the axial direction. The welding surface is welded with an electron beam.

CITATION LIST

Patent Literature

Patent Literature 1: Japanese Patent Application Laid-Open No. JP 2013-194528

SUMMARY

Technical Problem

Meanwhile, a seal groove is formed on an outer circumferential surface of a shaft. A sealing ring is provided in the seal groove. The dimensional accuracy required for the seal groove is high. In order to suppress thermal deformation due to heat during welding of the shaft and the impeller, development of a technique to suppress heat transfer from the welded portion to the seal groove is desired.

An object of the present disclosure is to provide a turbine shaft and a turbocharger each capable of suppressing heat transfer from a welded portion between a shaft and an impeller to a seal groove.

Solution to Problem

In order to solve the above problem, a turbine shaft according to one aspect of the present disclosure includes: an impeller having a protruding portion provided on a back surface of a main body portion thereof and a welded surface provided on the back surface of the main body portion in a radially outer side of the protruding portion; and a shaft having an end hole provided on one end surface thereof, the end hole in which the protruding portion is inserted, a welding surface provided in a radially outer side of the end hole and welded to the welded surface, a seal groove provided in another end side with respect to the welding surface, and an enlarged diameter portion formed between the welding surface and the seal groove, a diameter of the enlarged diameter portion expanding radially outward from the welding surface side toward the seal groove side.

A bottom surface of the seal groove may be positioned on a radially outer side of the welding surface.

The seal groove may be formed closer to another end side than the end hole is.

A center hole provided on a bottom surface of the end hole of the shaft and recessed in an axial direction and a curved portion provided on an inner circumferential surface of the center hole and having a curved cross-sectional shape including an axial center may be further provided.

In order to solve the above problem, a turbocharger according to one aspect of the present disclosure includes the turbine shaft described above.

Effects of Disclosure

According to the present disclosure, it is possible to suppress heat transfer from a welded portion between a shaft and an impeller to a seal groove.

DESCRIPTION OF EMBODIMENT

Embodiment of the present disclosure will be described in detail below with reference to the accompanying drawings. Dimensions, materials, other specific numerical values, and the like illustrated in such embodiment are merely examples for facilitating understanding, and the present disclosure is not limited thereby except for a case where it is specifically mentioned. Note that, in the present specification and the drawings, elements having substantially the same function and structure are denoted by the same symbol, and redundant explanations are omitted. Components not directly related to the present disclosure are not illustrated.

Figure 1:
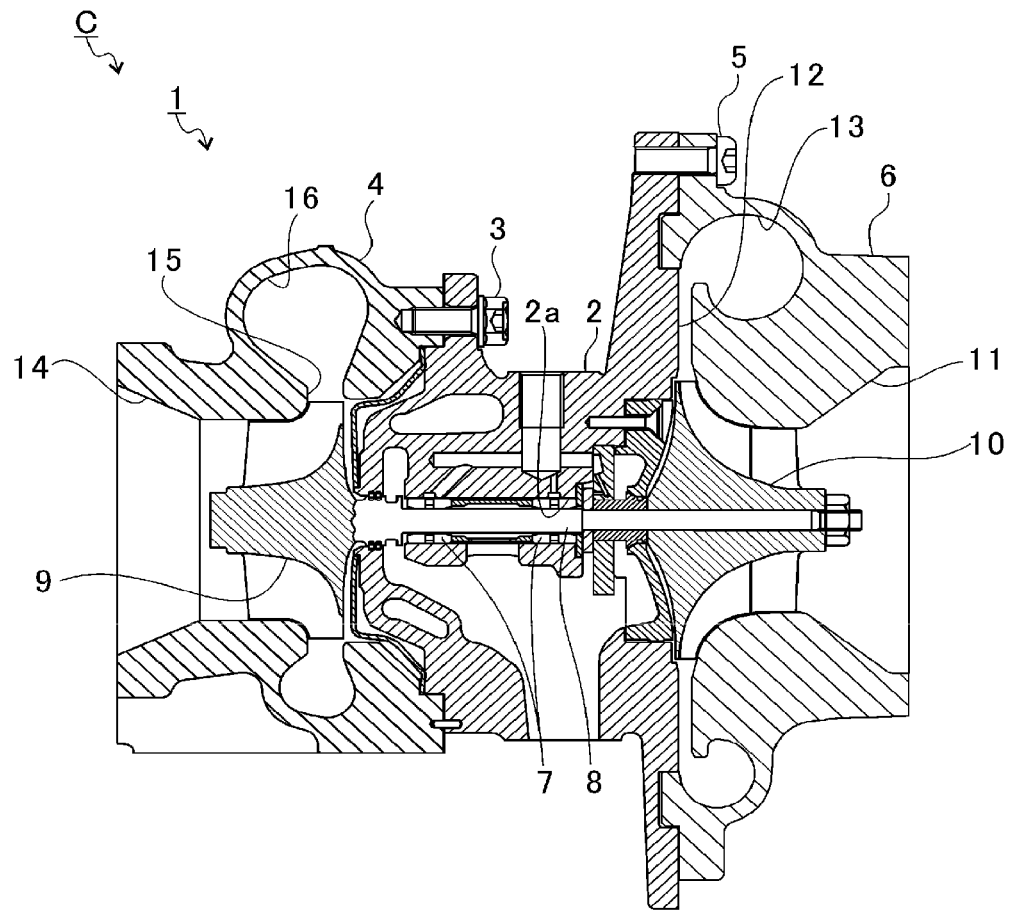
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is the left side of the turbocharger C. Descriptions are given assuming that a direction of an arrow R is the right side of the turbocharger C. As illustrated in FIG. 1, the turbocharger C includes a turbocharger main body 1. The turbocharger main body 1 includes a bearing housing 2. A turbine housing 4 is attached to the end surface of the bearing housing 2 by a fastening bolt 3. A compressor housing 6 is attached to the right end surface of the bearing housing 2 by a fastening bolt 5.

A bearing hole 2a is formed in the bearing housing 2. The bearing hole 2a penetrates through the turbocharger C in the horizontal direction. A bearing 7 is provided in the bearing hole 2a. A shaft 8 is pivotally supported by the bearing 7 in a freely rotatable manner. At the left end portion of the shaft 8, a turbine impeller 9 (impeller) is provided. The turbine impeller 9 is accommodated in the turbine housing 4 in a freely rotatable manner. Furthermore, a compressor impeller 10 is provided at the right end portion of the shaft 8. The compressor impeller 10 is accommodated in the compressor housing 6 in a freely rotatable manner.

An intake port 11 is formed in the compressor housing 6. The intake port 11 opens to the right side of the turbocharger C. The intake port 11 is connected to an air cleaner (not illustrated). Furthermore, in a state where the bearing housing 2 and the compressor housing 6 are connected by the fastening bolt 5, a diffuser flow passage 12 is formed. The diffuser flow passage 12 is formed by opposing surfaces of the bearing housing 2 and the compressor housing 6. The diffuser flow passage 12 pressurizes the air. The diffuser flow passage 12 is annularly formed outward from an inner side in the radial direction of the shaft 8. The diffuser flow passage 12 communicates with the intake port 11 via the compressor impeller 10 on aforementioned the inner side in the radial direction.

Furthermore, the compressor housing 6 includes a compressor scroll flow passage 13. The compressor scroll flow passage 13 is annular. The compressor scroll flow passage 13 is positioned on an outer side of the diffuser flow passage 12 in the radial direction of the shaft 8. The compressor scroll flow passage 13 communicates with an intake port of an engine (not illustrated). The compressor scroll flow passage 13 also communicates with the diffuser flow passage 12. Therefore, when the compressor impeller 10 rotates, the air is sucked into the compressor housing 6 from the intake port 11. The sucked air is accelerated by the action of the centrifugal force in the process of flowing through blades of the compressor impeller 10. The accelerated air is pressurized by the diffuser flow passage 12 and the compressor scroll flow passage 13. The pressurized air is guided to the intake port of the engine.

A discharge port 14 is formed in the turbine housing 4. The discharge port 14 opens to the left side of the turbocharger C. The discharge port 14 is connected to an exhaust gas purification device (not illustrated). In the turbine housing 4, a flow passage 15 and a turbine scroll flow passage 16 are provided. The turbine scroll flow passage 16 is annular. The turbine scroll flow passage 16 is positioned, for example, on an outer side of the flow passage 15 in the radial direction of the turbine impeller 9. The turbine scroll flow passage 16 communicates with a gas inlet port (not illustrated). To the turbine scroll flow passage 16, exhaust gas discharged from an exhaust manifold of the engine (not illustrated) is guided. The turbine scroll flow passage 16 communicates also with the flow passage 15. Therefore, the exhaust gas guided from the gas inlet port to the turbine scroll flow passage 16 is guided to the discharge port 14 via the flow passage 15 and between the blades of the turbine impeller 9 (among multiple blades 22). The exhaust gas guided to the discharge port 14 rotates the turbine impeller 9 in the process of flowing therethrough.

The turning force of the turbine impeller 9 is then transmitted to the compressor impeller 10 via the shaft 8. As described above, the air is pressurized by the turning force of the compressor impeller 10 and guided to the intake port of the engine.

Figure 2:
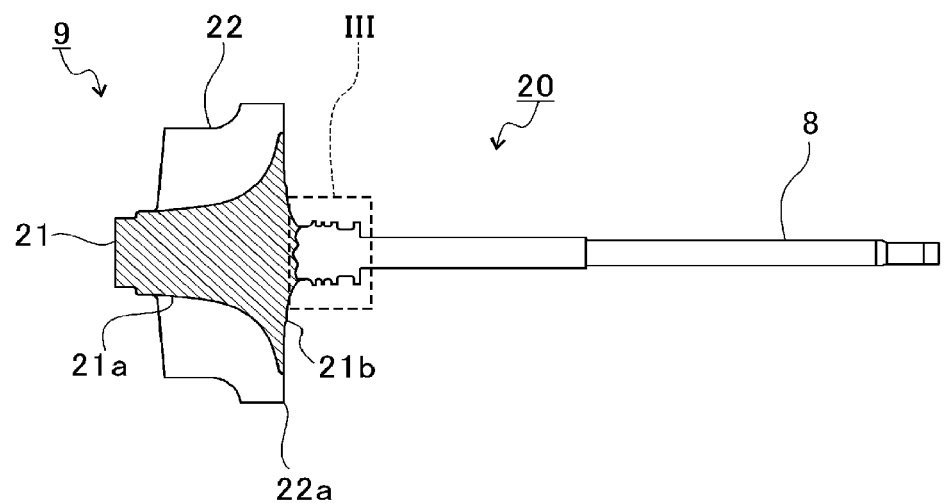
FIG. 2 is an explanatory diagram for explaining a turbine shaft.

FIG. 2 is an explanatory diagram for explaining a turbine shaft 20. As illustrated in FIG. 2, the turbine shaft 20 includes the shaft 8 and the turbine impeller 9 of a radial type, for example. The diameter of a main body portion 21 of the turbine impeller 9 expands from the left side (one side) toward the right side (the other side) in FIG. 2 in the axial direction of the turbine shaft 20 (hereinafter simply referred to as the axial direction).

An outer circumferential surface 21a of the main body portion 21 is exposed at one side thereof in the axial direction. A back surface 21b of the main body portion 21 is exposed at the other side thereof in the axial direction. The external shapes of the outer circumferential surface 21a and the back surface 21b when viewed in the axial direction are, for example, circular. The outer diameter of the outer circumferential surface 21a of the main body portion 21 gradually increases toward the other side thereof in the axial direction.

On the outer circumferential surface 21a, a plurality of blades 22 are provided. The plurality of blades 22 are spaced apart from each other in the circumferential direction of the outer circumferential surface 21a. The plurality of blades 22 projects radially outward from the outer circumferential surface 21a.

Furthermore, a radially inner side of the back surface 21b of the main body portion 21 protrudes in the axial direction. Specifically, the radially inner portion of the back surface 21b in the radial direction protrudes toward the shaft 8 (toward the compressor impeller 10, the right side in FIG. 2) from the position where the turbine impeller 9 (blades 22) extends in the axial direction. For example, in the case of a turbine impeller of a radial type, as illustrated in FIG. 2, the inner portion of the back surface 21b protrudes rightward from the outermost circumferential portion 22a (portion where the outer diameter of the main body portion 21 is the largest) of the turbine impeller 9 positioned outermost in the radial direction.

Then, the protruding portion of the back surface 21b of the main body portion 21 is inserted in an end hole (to be described later) of the shaft 8 and is welded. In this manner, the shaft 8 is joined to the back surface 21b of the main body portion 21 of the turbine impeller 9.

Figure 3:
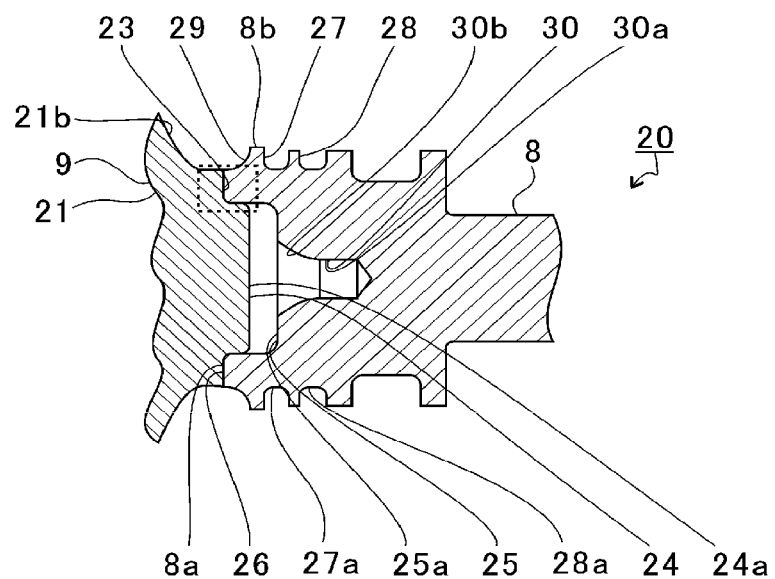
FIG. 3 is an explanatory diagram for explaining a welding structure of the turbine shaft.

FIG. 3 is an explanatory diagram for explaining a welding structure of the turbine shaft 20. In FIG. 3, a cross-sectional structure including the center of the shaft 8 extracted from the broken line III part of FIG. 2 is illustrated.

As illustrated in FIG. 3, a welded surface 23 is formed on the back surface 21b of the main body portion 21. The welded surface 23 is, for example, annular. The welded surface 23 is welded to the shaft 8. The welded surface 23 protrudes in the axial direction (toward the compressor impeller 10, rightward in FIGS. 2 and 3) from the outermost circumferential portion 22a (see FIG. 2) of the blades 22 provided to the main body portion 21 described above.

On a radially inner side of a portion where the outer diameter of the main body portion 21 is the largest (the maximum diameter portion of the main body portion 21, and in the example of the turbine impeller 9 of a radial type illustrated in FIG. 2, approximately the same position as that of the outermost circumferential portion 22a), the main body portion 21 and the blades 22 extend outward in the radial direction. At the maximum diameter portion of the main body portion 21, the centrifugal force acting during operation (during rotation of the turbine shaft 20) increases. Therefore, the position of the welded portion between the shaft 8 and the turbine impeller 9 is shifted toward the compressor impeller 10 from the maximum diameter portion of the main body portion 21 in the axial direction. In this case, displacement of the welded portion due to the centrifugal force is suppressed. This enables relieving concentration of stress.

On the back surface 21b of the main body portion 21, a protruding portion 24 is formed on an inner side in the radial direction of the welded surface 23. The protruding portion 24 protrudes in the axial direction from the welded surface 23. Furthermore, an end hole 25 is provided on one end surface 8a of the shaft 8. The end hole 25 is recessed in the axial direction from a welding surface 26 which will be described later. The protruding portion 24 of the turbine impeller 9 is inserted in the end hole 25. With the protruding portion 24 inserted in the end hole 25, the shaft 8 and the turbine impeller 9 are positioned such that their respective axial centers are coaxial.

The welding surface 26 is formed in a radially outer side of the end hole 25 of the shaft 8. The protruding portion 24 of the turbine impeller 9 is inserted in the end hole 25 of the shaft 8. In this manner, in the state where the welded surface 23 and the welding surface 26 are in contact with each other, a front end surface 24a of the protruding portion 24 is spaced apart from a bottom surface 25a of the end hole 25. That is, positioning of the shaft 8 in the axial direction is performed by the welding surface 26. Here, for example, it is conceivable that the welded surface 23 and the welding surface 26 are perpendicular to the axial direction.

In this case, outer circumferential sides of the welding surface 26 and the welded surface 23 are exposed. An electron beam or a laser beam is radiated to the welding surface 26 and the welded surface 23 from the outer circumferential side in the circumferential direction. In this manner, the welding surface 26 and the welded surface 23 are welded.

Furthermore, a first seal groove 27 and a second seal groove 28 (seal groove) are formed on the outer circumferential surface of the shaft 8. The first seal groove 27 and the second seal groove 28 are positioned on the right side (the other end side) in FIG. 3 with respect to the welding surface 26. The first seal groove 27 and the second seal groove 28 are arranged in the order of the first seal groove 27 and the second seal groove 28 from the welding surface 26 side. Each of the first seal groove 27 and the second seal groove 28 is inserted in an inner circumferential side of a sealing ring.

Figure 4:
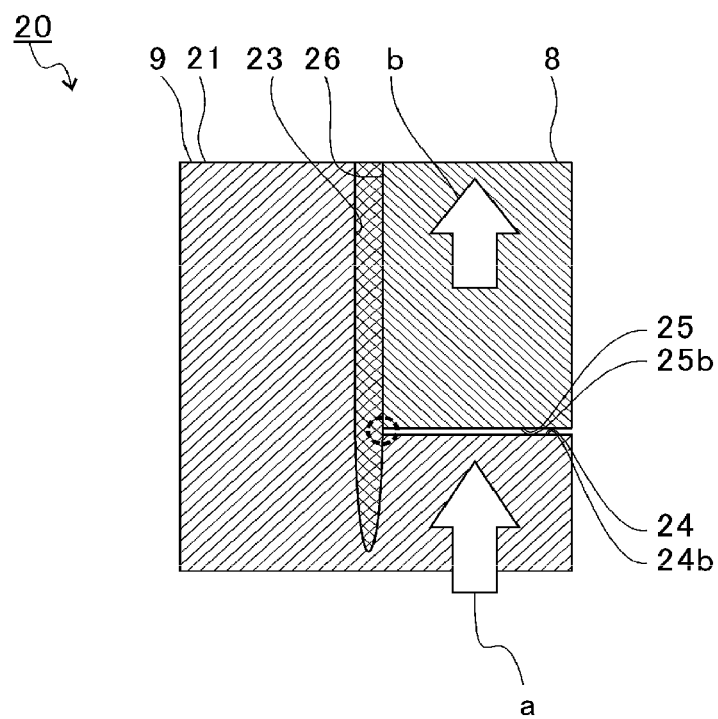
FIG. 4 is an enlarged view of a broken line part extracted from FIG. 3.

FIG. 4 is an enlarged view of a broken line part extracted from FIG. 3. In FIG. 4, the welded portion between the welding surface 26 of the shaft 8 and the welded surface 23 of the turbine impeller 9 is indicated by cross hatching. During rotation of the turbine shaft 20, a displacement amount due to the centrifugal stress acting on the main body portion 21 of the turbine impeller 9 (indicated by white arrow a in FIG. 4) is slightly larger than a displacement amount due to the centrifugal stress acting on the shaft 8 (indicated by white arrow b in FIG. 4). Here, for example, a material of the turbine impeller 9 may be a Ni-based superalloy such as an Inconel material. A material of the shaft 8 may be high-strength carbon steel such as chromium molybdenum steel.

Figure 5:
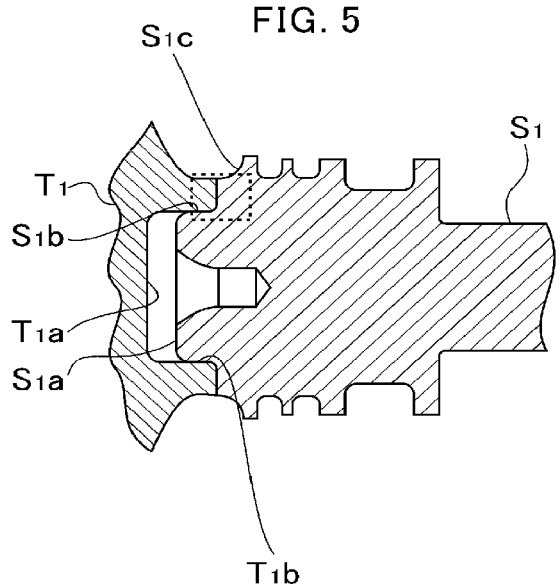
FIG. 5 is a first diagram for explaining a first comparative example.
Figure 6:
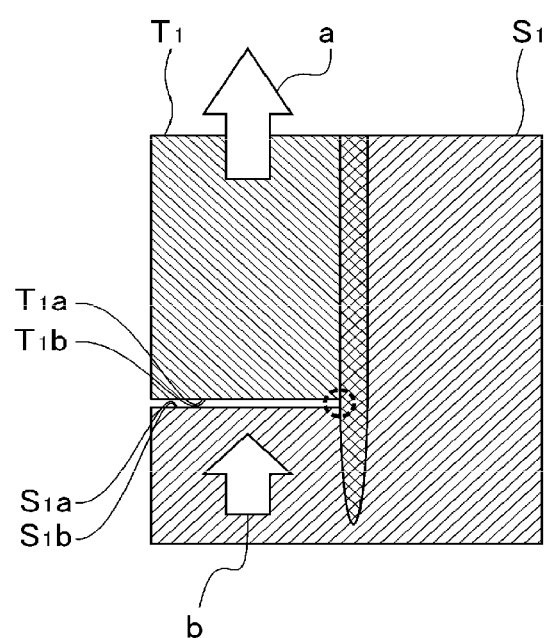
FIG. 6 is a second diagram for explaining the first comparative example.

FIGS. 5 and 6 are diagrams for explaining a first comparative example. In FIG. 5, a cross-sectional view of a portion corresponding to FIG. 3 in the first comparative example is illustrated. FIG. 6 is an enlarged view of a broken line part extracted from FIG. 5.

As illustrated in FIG. 5, in the first comparative example, a protruding portion $S_1a$ is provided to a shaft $S_1$. An end hole $T_1a$ is provided in a turbine impeller $T_1$. The protruding portion $S_1a$ is inserted in the end hole $T_1a$. When the shaft $S_1$ and the turbine impeller $T_1$ rotate, the displacement amount due to the centrifugal stress acting on the turbine impeller $T_1$ (indicated by a white arrow a in FIG. 6) becomes bigger than the displacement amount due to the centrifugal stress acting on the shaft $S_1$ (indicated by a white arrow b in FIG. 6).

As a result, the tensile stress acts on the vicinity of an outer circumferential surface $S_1b$ of the protruding portion $S_1a$ and an inner circumferential surface $T_1b$ of the end hole $T_1a$ of the welded portion (indicated by a broken line circle in FIG. 6).

In the present embodiment, the shaft 8 includes the end hole 25. The turbine impeller 9 is provided with the protruding portion 24. In this case, as described above, a displacement amount displaced upward in FIG. 4 of the inner circumferential surface 25b of the end hole 25 is smaller than that of the outer circumferential surface 24b of the protruding portion 24 of the turbine impeller 9. At this time, compressive stress acts, in the radial direction, on the vicinity of the outer circumferential surface 24b of the protruding portion 24 and the inner circumferential surface 25b of the end hole 25 (indicated by a circle of a broken line in FIG. 4) of the welded portion. Therefore, even when stress is concentrated in the vicinity of the outer circumferential surface 24b of the protruding portion 24 and the inner circumferential surface 25b of the end hole 25 in the welded portion due to the centrifugal force during rotation of the turbine shaft 20, it is possible to prevent a force from being generated in a direction which a clearance formed between the outer circumferential surface 24b and the inner circumferential surface 25b progresses in the axial direction as a crack.

As illustrated in FIG. 3, the enlarged diameter portion 29 may be formed on the outer circumferential surface of the shaft 8 between the welding surface 26 and the first seal groove 27 (second seal groove 28). The diameter of the enlarged diameter portion 29 expands radially outward from the welding surface 26 side toward the first seal groove 27. As illustrated in FIG. 3, a cross-sectional shape including the axial center of the shaft 8 (hereinafter, simply referred to as a cross-sectional shape) of the enlarged diameter portion 29 is, for example, a curved line.

In other words, the enlarged diameter portion 29 is formed in a partition wall 8b. The partition wall 8b is positioned between the first seal groove 27 and the welding surface 26 of the shaft 8. That is, the thickness (annular cross-sectional area) perpendicular to the axial direction of the partition wall 8b is increased toward the first seal groove 27. Furthermore, the enlarged diameter portion 29 is continuously formed, for example, from the outer circumferential end of the welding surface 26.

For example, when the welded surface 23 and the welding surface 26 are welded, the heat generated by the welding is transferred from the welding surface 26 toward the first seal groove 27 and the second seal groove 28 in the shaft 8. Here, the first seal groove 27 and the second seal groove 28 require a high accuracy in dimensions. In the case where the thermal deformation of the first seal groove 27 and the second seal groove 28 is large, it is necessary to separately perform machining or the like to ensure accuracy. Therefore, it is desired to suppress this thermal deformation. In the case of providing the enlarged diameter portion 29, the heat transferred from the welding surface 26 toward the first seal groove 27 and the second seal groove 28 diffuses in the radial direction. This enables suppressing the amount of heat reaching in the axial direction. As a result, thermal deformation of the first seal groove 27 and the second seal groove 28 due to heat transfer during welding can be alleviated.

Figure 7:
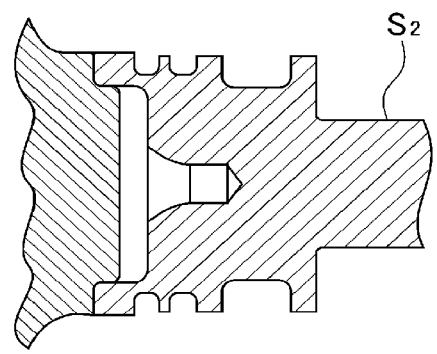
FIG. 7 is a view for explaining a second comparative example.

FIG. 7 is an explanatory diagram for explaining a second comparative example. As illustrated in FIG. 7, in the second comparative example, the maximum outer diameter of the shaft $S_2$ is roughly equal to the maximum outer diameter of the shaft 8. The enlarged diameter portion 29 is not formed in the shaft $S_2$.

In the present embodiment, the enlarged diameter portion 29 is provided without changing the maximum outer diameter of the shaft 8 as compared to the second comparative example. The welding surface 26, the welded surface 23, the protruding portion 24, and the end hole 25 are positioned on an inner side in the radial direction as compared to those of the second comparative example. In other words, the outer circumferential surface 24b of the protruding portion 24 and the inner circumferential surface 25b of the end hole 25 are shifted inward in the radial direction compared with the second comparative example in order to provide the enlarged diameter portion 29.

As in the first comparative example, assuming that the protruding portion $S_1a$ of the shaft $S_1$ is provided and the end hole $T_1a$ is provided in the turbine impeller $T_1$. In this case, providing an enlarged diameter portion $S_1c$ in the shaft $S_1$ results in a larger radial distance between the maximum diameter portion of the main body portion 21 of the turbine impeller 9 and the protruding portion $S_1a$. Therefore, a difference in displacement of the outer circumferential surface $S_1b$ of the protruding portion $S_1a$ and the inner circumferential surface $T_1b$ of the end hole $T_1a$ is increased by the centrifugal force at the time of rotation of the turbine shaft 20. This results in an even greater tensile stress in the welded portion.

In the present embodiment, the end hole 25 is provided in the shaft 8. The protruding portion 24 is provided to the turbine impeller 9. Compression stress acts on the welded portion. Therefore, it is suitable also for the case of providing an enlarged diameter portion without changing the maximum outer diameter of the shaft 8. Here, the protruding portion 24 of the turbine impeller 9 has a solid shape. Therefore, even if the centrifugal stress increases, the displacement amount is unlikely to increase. On the other hand, the inner circumferential surface 25b of the end hole 25 of the shaft 8 has a larger amount of increase in the displacement amount with respect to an increase in the centrifugal stress than that of the outer circumferential surface 24b of the protruding portion 24.

As a result, a difference in the displacement amount of the outer circumferential surface 24b of the protruding portion 24 of the turbine impeller 9 and that of the inner circumferential surface 25b of the end hole 25 is reduced. Therefore, the compressive stress generated in the welded portion can be further suppressed.

In this manner, the end hole 25 is provided in the shaft 8. The protruding portion 24 is provided to the turbine impeller 9. The enlarged diameter portion 29 is provided to the shaft 8. As a result, the effect of suppressing stress from concentrating on the welded portion is synergistically improved. This enables suppressing heat transfer to the first seal groove 27 and the second seal groove 28.

Furthermore, as illustrated in FIG. 3, a bottom surface 27a of the first seal groove 27 and a bottom surface 28a of the second seal groove 28 may be positioned in a radially outer side of the welding surface 26. In this case, the heat generated by welding of the welded surface 23 and the welding surface 26 is transferred radially outward and reaches the first seal groove 27 and the second seal groove 28. As a result, it is possible to secure a long path for heat transfer and to suppress the amount of heat reaching the first seal groove 27 and the second seal groove 28.

Moreover, the second seal groove 28 may be formed on a right side (the other end side) in FIG. 3 with respect to the bottom surface 25a of the end hole 25. In this case, the thickness between the second seal groove 28 and the end hole 25 is sufficiently secured. This enables improving the strength.

A center hole 30 recessed in the axial direction may be provided on the bottom surface 25a of the end hole 25 of the shaft 8. The center hole 30 is provided, for example, for attachment to a processing apparatus at the time of processing the shaft 8 with the center (axial center) of the shaft 8 aligned.

A curved portion 30b may be further formed on an inner circumferential surface 30a of the center hole 30. The curved portion 30b has a curved cross-sectional shape. The cross-sectional shape of the curved portion 30b is, for example, a curve in which the center side protrudes radially inward from the both end sides. In the case of including the curved portion 30b, concentration of stress in the vicinity of the end hole 25 and the center hole 30 is alleviated. This enables improving the strength of the shaft 8.

Although the embodiment has been described with reference to the accompanying drawings, it is naturally understood that the present disclosure is not limited to the above embodiment. It is clear that those skilled in the art can conceive various modifications or variations within the scope described in the claims, and it is understood that they are naturally also within the technical scope.

For example, in the embodiment described above, the case where both of the first seal groove 27 and the second seal groove 28 are provided has been described. However, the seal groove is not limited to these. For example, only one seal groove may be provided in the shaft 8, for example, with the first seal groove 27 not provided and only the second seal groove 28 provided. Furthermore, in the case where a seal groove is positioned closer to the other end side than the end hole 25 is, the thickness between the seal groove and the end hole 25 is sufficiently secured as in the embodiment described above. This enables improving the strength.

Furthermore, in the embodiment described above, the case where the enlarged diameter portion 29 is continuously formed from the outer circumferential end of the welding surface 26 has been described. However, the enlarged diameter portion 29 is not limited to this. For example, it is sufficient that a region that is enlarged is partially provided between the welding surface 26 and the first seal groove 27. For example, the enlarged diameter portion 29 may be spaced apart from the welding surface 26 in the direction of the rotation axis. Furthermore, for example the enlarged diameter portion 29 may be discontinuous. For example, a parallel portion or the like may be provided in the enlarged diameter portion 29. In the case where the enlarged diameter portion 29 is continuously formed from the outer circumferential end of the welding surface 26, workability is improved. This enables improving the productivity.

Furthermore, in the embodiment described above, the case where the cross-sectional shape of the enlarged diameter portion 29 is curved has been described. However, the enlarged diameter portion 29 may be, for example, linear as long as the diameter expands radially outward from the welding surface 26 toward the first seal groove 27 and the second seal groove 28.

Furthermore, in the embodiment described above, the case where the protruding portion 24 is positioned on an inner side of the enlarged diameter portion 29 in the radial direction has been described. However, the protruding portion 24 is not limited to this. For example, the protruding portion 24 may extend closer to the compressor impeller 10 than a region corresponding to a radially inner side of the enlarged diameter portion 29 is.

Furthermore, in the embodiment described above, the case where the bottom surface 27a of the first seal groove 27 and the bottom surface 28a of the second seal groove 28 are positioned in a radially outer side of the welding surface 26 has been described. However, the bottom surface 27a of the first seal groove 27 and the bottom surface 28a of the second seal groove 28 may be positioned in a radially inner side of the welding surface 26. The bottom surface 27a of the first seal groove 27 and the bottom surface 28a of the second seal groove 28 may have the same position in the radial direction as that of the welding surface 26.

Furthermore, in the embodiment described above, the case where the second seal groove 28 is formed closer to the other end side than the end hole 25 is has been described. However, the second seal groove 28 may be formed closer to the one end side than the end hole 25 is. The second seal groove 28 may have the same position in the axial direction as that of the end hole 25.

Further, in the embodiment described above, the case where the curved portion 30b is formed on the inner circumferential surface 30a of the center hole 30 has been described. However, the curved portion 30b is not an indispensable component.

Furthermore, in the embodiment described above, the case where the turbine impeller 9 is a radial type has been described. Note that the turbine impeller 9 may be of a diagonal flow type or an axial flow type.

Furthermore, in the embodiment described above, the case where the outer circumferential surface 21a and the back surface 21b of the turbine impeller 9 have a circular outer diameter when viewed in the axial direction has been described. However, the outer circumferential surface 21a and the back surface 21b of the turbine impeller 9 are not limited to this. For example, the back surface 21b may not be circular (full disk), and a notch (scallop) may be provided on the back surface 21b between a pair out of the plurality of blades 22.

Furthermore, in the embodiment described above, the case where the turbine shaft 20 is provided in the turbocharger C has been described as an example. However, the turbine shaft 20 may be provided in another turbine such as a gas turbine.

INDUSTRIAL APPLICABILITY

The present disclosure can be applied to a turbine shaft including a shaft and an impeller and to a turbocharger.

What is claimed is:
1. A turbine shaft comprising:
an impeller having
a protruding portion provided on a back surface of a main body portion thereof and
a welded surface provided on the back surface of the main body portion in a radially outer side of the protruding portion; and
a shaft having
an end hole provided on one end surface thereof, the end hole in which the protruding portion is inserted,
a welding surface provided in a radially outer side of the end hole and welded to the welded surface,
a seal groove provided in another end side with respect to the welding surface, a bottom surface of the seal groove being positioned on a radially outer side of an outer peripheral end of the welding surface, and
an enlarged diameter portion formed between the welding surface and the seal groove, a diameter of the enlarged diameter portion expanding radially outward from a welding surface side toward a seal groove side.

2. The turbine shaft according to claim 1, wherein the seal groove is formed closer to the other end side than the end hole is.

3. The turbine shaft according to claim 2, further comprising:
a center hole provided on a bottom surface of the end hole of the shaft and recessed in an axial direction; and
a curved portion provided on an inner circumferential surface of the center hole and having a curved cross-sectional shape including an axial center.

4. A turbocharger comprising the turbine shaft according to claim 3.

5. A turbocharger comprising the turbine shaft according to claim 2.

6. The turbine shaft according to claim 1, wherein the seal groove is formed closer to the other end side than a bottom of the end hole is.

7. The turbine shaft according to claim 6, further comprising:
a center hole provided on a bottom surface of the end hole of the shaft and recessed in an axial direction; and
a curved portion provided on an inner circumferential surface of the center hole and having a curved cross-sectional shape including an axial center.

8. A turbocharger comprising the turbine shaft according to claim 7.

9. A turbocharger comprising the turbine shaft according to claim 6.

10. The turbine shaft according to claim 1, further comprising:
a center hole provided on a bottom surface of the end hole of the shaft and recessed in an axial direction; and
a curved portion provided on an inner circumferential surface of the center hole and having a curved cross-sectional shape including an axial center.

11. A turbocharger comprising the turbine shaft according to claim 10.

12. A turbocharger comprising the turbine shaft according to claim 1.

* * * * *